United States Patent [19]
Eckels

[11] Patent Number: 4,488,406
[45] Date of Patent: Dec. 18, 1984

[54] COUPLING FOR CRYOGENIC LIQUID TRANSFER INTO ROTATING APPARATUS

[75] Inventor: Phillip W. Eckels, Penn Hills, Pa.

[73] Assignee: Electric Power Research Institute, Inc., Palo Alto, Calif.

[21] Appl. No.: 571,261

[22] Filed: Jan. 16, 1984

[51] Int. Cl.$^3$ .............................................. F17C 7/02
[52] U.S. Cl. ......................................... 62/55; 62/505; 277/203; 277/215; 285/47; 285/DIG. 5; 310/64
[58] Field of Search ...................... 62/55, 505; 310/54, 310/62, 64; 285/47, DIG. 5; 277/203, 215

[56] References Cited

U.S. PATENT DOCUMENTS

| | | | |
|---|---|---|---|
| 3,626,717 | 12/1971 | Lorch | 62/505 |
| 3,775,989 | 12/1973 | Mursinna | 62/55 |
| 3,823,569 | 7/1974 | Sellmaier et al. | 62/55 |
| 3,845,639 | 11/1974 | Smith, Jr. et al. | 62/505 |
| 3,991,588 | 11/1976 | Laskaris | 62/55 |
| 4,280,071 | 7/1981 | Eckels | 310/52 |
| 4,356,700 | 11/1982 | Eckels et al. | 62/55 |

Primary Examiner—Ronald C. Capossela
Attorney, Agent, or Firm—G. H. Telfer

[57] ABSTRACT

A liquid coolant transfer device that has a stationary tube fit within a rotating conduit and a threaded throwback seal on the surface of the rotating element is further provided with a seal and bearing device in the form of a washer affixed to the conduit at the end of the threaded insert and extending across the gap between the rotating and stationary tubes for preventing liquid coolant flow therethrough even during severe flooding caused by faults within the electrical machine with which it is connected.

3 Claims, 3 Drawing Figures

COUPLING FOR CRYOGENIC LIQUID TRANSFER INTO ROTATING APPARATUS

BACKGROUND AND SUMMARY OF THE INVENTION

This invention relates to devices for transferring a cryogenic liquid from a stationary source into a rotating machine such as a dynamoelectric machine having a superconducting winding on its rotor.

Cryogenic liquids such as helium have substantial benefits in cooling electrical conductors such as a superconducting field winding on the rotor of an AC generator but their use presents delicate problems in transferring the liquid from a stationary source into the rotating member and in maintaining thermodynamic and mechanical stability under all conditions, including transient fault conditions, for which the machine is designed to be operable. That is, the need is for transfer devices that are not only effective under some ideal set of conditions but which are also effective for a range of perturbations in the system that can be normally expected to occur sometime in operation.

An approach to a fluid transfer coupling for cryogenically cooled rotors is presented in Laskaris U.S. Pat. No. 3,991,588, Nov. 16, 1976. Here, a stationary supply tube runs axially within the end of a delivery conduit, that rotates with the rotor shaft, in a bayonet type of fit. By the means disclosed in the patent, coolant is delivered from the tube to form an annular liquid region on the surface of the conduit by centrifugal action. Coolant is intended to be prevented from escaping between the tube and the conduit by a seal element affixed to the conduit that extends radially inward a greater distance than the anticipated extent of the annular liquid region. This arrangement is not regarded as desirable or effective where the machine can be normally expected to be subject to transient fault conditions in which a pressure buildup occurs in the rotor causing a large mass of liquid to back up in the supply tube and conduit and to substantially flood the entire volume of those channels.

The foregoing considerations were taken into account and solved by the apparatus disclosed in Eckels et al. U.S. Pat. No. 4,356,700, Nov. 2, 1982, in which the bayonet coupling is designed for operation under flooded conditions with a threaded throwback or wind back seal disposed on the interior surface of the rotating conduit proximate the end of the fixed supply tube so that the rotation of the conduit induces fluid flow continuously in a downstream direction as the fluid is carried by the threads on the surface of the conduit. This is a successful arrangement but requires careful consideration of the design of the threaded member in relation to all the possible coolant supply conditions to insure that the threads are continuously effective to move coolant in the downstream direction without any appreciable amount of coolant escaping upstream which would be adverse to the system. Additionally, another aspect of the transfer system that affects the performance of the coupling is that the normal supply of coolant, through the fixed tube, is a churning mixture of liquid and vapor that induces mechanical pulsations giving rise to a critical mechanical natural frequency, hence subjecting the end of the fixed tube, which cannot be readily supported directly, to vibration that can cause it and its coaxial vacuum seal to be abraded by the rotating conduit, which itself may be subjected to some incidental radial motion.

The foregoing problems are addressed and solved by the present invention which utilizes a transfer device of the same general character as that of the abovementioned Eckels et al. U.S. Pat. No. 4,356,700, which is herein incorporated by reference for the entirety of its disclosure, with the improvement thereto of having an upstream seal and bearing device, such as in the form of an annular washer-shaped element, affixed to the inner wall of the rotatable conduit at the upstream end of the threaded member providing the throwback function. The washer has an inner diameter less than that of the threaded member for preventing movement of liquid upstream therefrom and, in addition, the inner diameter surface of the washer serves as a bearing surface for relative motion of the rotatable conduit and the stationary tube. The arrangement preferably locates the washer element closely proximate the downstream end of the coaxial sleeve that is disposed around the stationary tube and vacuum sealed therewith. The washer element extends radially inward from the rotatable conduit past the outer radial extent of the coaxial sleeve on the stationary tube. This allows the seal and bearing device or washer to safely limit and control mechanical vibration to which the stationary tube and its coaxial sleeve are subjected.

What is achieved is an arrangement in which the dynamoelectric machine winding can be designed for certain permissible transient fault conditions during which pressure rise in the rotor causes liquid to reverse flow in the conduit and in the tube with the upstream seal and bearing device preventing reverse flowing liquid from escaping between the outer surface of the tube and the inner surface of the conduit and also doubling as a bearing element for the relative motion of the fixed and rotating members.

DESCRIPTION OF THE PREFERRED EMBODIMENTS

Figure 1:
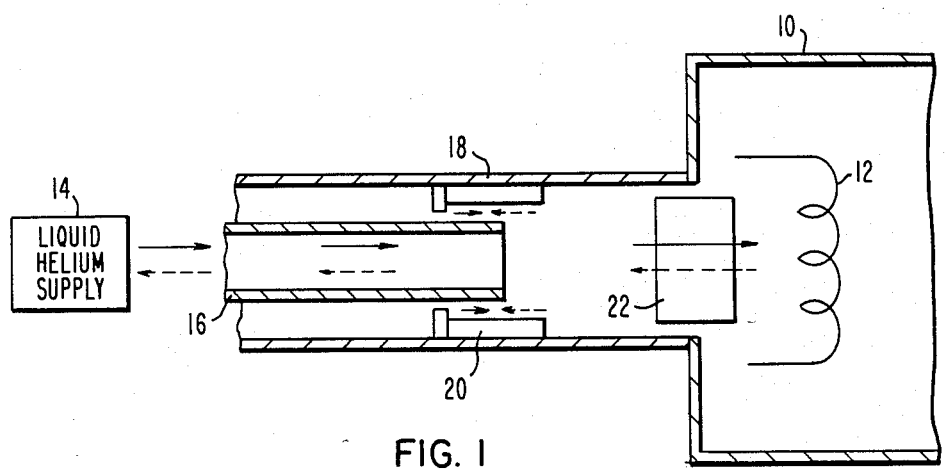
FIG. 1 is a schematic illustration of a helium transfer system of a superconducting rotor showing the general location of elements of the present invention.

Referring to FIG. 1, a superconducting rotor 10 is shown that has a cryogenically cooled winding 12 therein. Cryogenic coolant, such as helium, is supplied from an external source 14 through a stationary tube 16 that extends within a rotating conduit 18 that is joined with the rotor 10 for rotating therewith. In this view, the solid arrows indicate the direction of coolant supplied into the rotor 10 during normal operation while the dashed arrows indicate the reverse direction in which coolant may flow during transient conditions during which a transfer device 20 in accordance with the present invention provides mechanical and thermodynamic stability.

The transfer device 20 is between the stationary tube 16 through which the coolant is supplied and the rotating conduit 18 proximate the end of the stationary tube and extending somewhat upstream therefrom. Its intended function is to permit backflow through the stationary tube 16 under the indicated transients but to prevent backflow between the tube and the rotating conduit 18.

An additional element of the general view of FIG. 1 is a vapor trap and regulator 22 disposed axially inward of the end of the stationary tube 16 that has a cooperative affect with the transfer coupling 20 and may be of a character such as is shown in Eckels U.S. Pat. No. 4,280,071, July 21, 1981, which is herein incorporated by reference for its entire disclosure.

Figure 2:
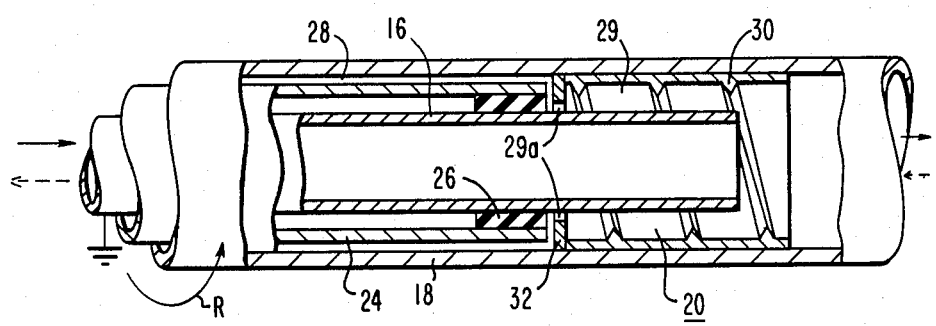
FIG. 2 is a side view, partly broken away and partly in section, of a more specific embodiment of the coupling portion of the present invention.

Referring to FIG. 2, a liquid helium transfer coupling 20 is illustrated in accordance with a specific embodiment of the present invention and it is generally consistent with above-mentioned Eckels et al. U.S. Pat. No. 4,356,700. The rotating conduit 18 is disposed coaxially about the stationary supply tube 16. The stationary tube 16 is disposed within another stationary sleeve 24 in order to form a vacuum jacket in conjunction with a seal ring 26. This jacket 24 is used to insulate a major portion of the length of the stationary tube 16. A clearance gap 28 exists around the outer stationary sleeve 24 and a gap 29 around the inner stationary tube 16 where it extends beyond the vacuum jacket.

Device 20 comprises a cylindrical threaded insert 30 disposed on the rotating conduit 18 in the vicinity of the delivery end of the stationary tube 18. Part of the threaded insert 30 extends forward and part to the rear of the delivery end of the tube 18. The insert 30 has threads which run in a direction that, in response to rotation of the rotating elements in the direction R, creates a force on the liquid helium that moves it out of the clearance gap 29 downstream towards the rotor. Therefore, these threads operate to advance coolant toward the rotor no matter in which direction coolant flow is occurring in a particular time in the supply tube 16 itself.

Figure 3:
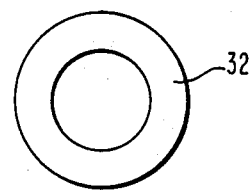
FIG. 3 is a plan view of an element of FIG. 2.

In accordance with the present invention the device 20 is provided with an additional element 32 that is a seal and bearing device at the end of the threaded insert 30 proximate the beginning of the stationary tube's outer sleeve 24. The seal and bearing element 32, shown in plan view in FIG. 3, is essentially an annular washer-shaped element which may be made of brass, for example. The washer 32 is affixed to the wall of the rotating conduit 18 at the end of the threaded insert 30 and extends within the gap 29 between the conduit and the stationary tube 16 to a greater extent than the threads and also completely emcompasses the extent of the gap 28 between the sleeve 24 and the rotating conduit.

There may be a certain amount of vapor allowed to escape between the rotating and stationary elements through the remaining gap 29a between the washer 32 and the tube 16. This is beneficial in order to reduce the temperature gradient in the metal elements 24 and 18, and hence heat leak, while retaining effectiveness against flow of liquid.

In addition to the gap sealing function provided by the washer element 32, it provides a significant bearing function. That is, because of the dynamic instabilities of the stationary tube 16 during operation with coolant supplied therethrough and the rotation of the rotating conduit 18, there may occur incidental contact between the elements 18 and 24 that are closely spaced, such as by a gap 28 of about 0.035 inch (about 0.9 mm). The washer element 32 permits the relative motion between the two to be limited and controlled to avoid damage.

For the sealing and bearing functions as intended herein, it would normally be desirable that the inside diameter of the washer 32 be closely spaced to the outer surface of the stationary tube 16 such as by a distance of about 0.030 inch (about 8 mm.) in gap 29a. In other dimensions applicable hereto, the inner surface of the rotating conduit 18 and the outer surface of the stationary tube 16 would be about 0.030 inch (about 1.8 mm.) apart, for example. The threaded insert would have threads extending about 0.035 inch (about 0.9 mm.) from the surface of the conduit 18, for example, that is, at least somewhat less than the radial dimension of the washer 32 of about 0.040 inch (about 1.0 mm.).

It is therefore seen that the present invention provides a simple and yet effective improvement in rotating helium transfer systems by permitting the supeconducting generator to be more fault worthy by allowing reverse flow of coolant without impairment due to liquid losses as well as permitting control of the mechanical instabilities induced in the system during normal operation.

Fault worthiness of superconducting rotors and stability of their cooling system are also affected by coolant vapor return paths through the conductive leads of the rotor winding; see Eckels copending application (W. E. Ser. No. 51,175), filed of even date herewith and assigned to the present assignee, for a description of that aspect of the system.

I claim:

1. A fluid transfer coupling, for introducing a cryogenic liquid into a rotating machine, comprising:
    a rotatable conduit disposed for coaxial rotation with the rotating machine;
    a stationary tube whose diameter is less than that of said rotatable conduit and having a delivery end located within said rotatable conduit for delivery of the cryogenic liquid thereto;
    a threaded member affixed to the inner surface of said rotatable conduit for rotation therewith, spaced from said stationary tube, said threaded member encompassing said delivery end of said tube for a distance downstream therefrom and for a distance upstream therefrom for advancing the cryogenic liquid in a direction forward from said delivery end; and,
    an upstream seal and bearing device comprising an annular washer-shaped element affixed to the inner wall of said rotatable conduit at the upstream end of said threaded member and having an inner diameter that is less than that of said threaded member for preventing movement of the cryogenic liquid upstream from said threaded member with the inner diameter surface of said washer-shaped element serving as a bearing surface for relative motion of said rotatable conduit and said stationary tube.

2. A fluid transfer coupling in accordance with claim 1 wherein:
    said stationary tube has, over its length upstream from said threaded member, a coaxial sleeve therearound with a sealed vacuum space therebetween and said upstream seal and bearing device is located proximate the downstream end of said coaxial sleeve, said stationary tube and said coaxial sleeve being subjected to mechanical vibration during normal operation which is safely limited and controlled by said seal and bearing device.

3. A fluid transfer coupling in accordance with claim 1 wherein:
    said rotatable conduit is disposed for rotation with and delivery of cryogenic liquid into a rotating machine which is the rotor of a dynamoelectric machine having a superconducting winding that is subject to permissible transient fault conditions during which pressure rise in the rotor causes cryogenic liquid to reverse flow in said conduit and said tube with said upstream seal and bearing device preventing reverse flowing liquid from escaping between the outer surface of said tube and the inner surface of said conduit.

* * * * *